United States Patent
Tanaka et al.

(10) Patent No.: US 11,088,577 B2
(45) Date of Patent: Aug. 10, 2021

(54) PERMANENT MAGNET SYNCHRONOUS MACHINE AND METHOD FOR MANUFACTURING PERMANENT MAGNET SYNCHRONOUS MACHINE STATOR

(71) Applicant: Mitsubishi Electric Corporation, Chiyoda-ku (JP)

(72) Inventors: Toshinori Tanaka, Chiyoda-ku (JP);
Kenta Motoyoshi, Chiyoda-ku (JP);
Toru Ogawa, Chiyoda-ku (JP);
Shinichi Yamaguchi, Chiyoda-ku (JP);
Ryuichi Takiguchi, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 234 days.

(21) Appl. No.: 16/098,513

(22) PCT Filed: Jan. 23, 2017

(86) PCT No.: PCT/JP2017/002077
§ 371 (c)(1),
(2) Date: Nov. 2, 2018

(87) PCT Pub. No.: WO2017/216995
PCT Pub. Date: Dec. 21, 2017

(65) Prior Publication Data
US 2019/0148995 A1 May 16, 2019

(30) Foreign Application Priority Data
Jun. 17, 2016 (JP) .............................. JP2016-120500

(51) Int. Cl.
*H02K 1/14* (2006.01)
*H02K 21/04* (2006.01)
(Continued)

(52) U.S. Cl.
CPC ................. *H02K 1/14* (2013.01); *H02K 1/17* (2013.01); *H02K 15/02* (2013.01); *H02K 19/24* (2013.01); *H02K 21/04* (2013.01); *H02K 41/03* (2013.01)

(58) Field of Classification Search
CPC .......... H02K 1/14; H02K 19/24; H02K 21/04; H02K 41/03; H02K 1/17; H02K 15/02;
(Continued)

(56) References Cited

U.S. PATENT DOCUMENTS 6,150,746 A * 11/2000 Lechner ............... H02K 21/044
310/181
7,737,597 B2 * 6/2010 Jajtic ...................... H02K 21/12
310/216.008
(Continued)

FOREIGN PATENT DOCUMENTS

JP 2002-199679 A 7/2002
JP 2009-528808 A 8/2009
(Continued)

OTHER PUBLICATIONS

International Search Report dated Mar. 21, 2017 in PCT/JP2017/002077 filed on Jan. 23, 2017.

*Primary Examiner* — Donghai D Nguyen
(74) *Attorney, Agent, or Firm* — Xsensus LLP

(57) ABSTRACT

A permanent magnet synchronous machine includes a stator including a plurality of split core blocks that are continuously arranged in a rotation direction of a rotor. The plurality of split core blocks each includes: a permanent magnet; a pair of teeth arranged on both ends of the permanent magnet so as to sandwich the permanent magnet in the rotation direction; and connection teeth, which are provided on axial end portions of the pair of teeth sandwiching the permanent magnet, and are configured to connect the pair of teeth.

18 Claims, 15 Drawing Sheets

(51) Int. Cl.
*H02K 41/03* (2006.01)
*H02K 1/17* (2006.01)
*H02K 15/02* (2006.01)
*H02K 19/24* (2006.01)

(58) Field of Classification Search
CPC ...... H02K 1/148; H02K 15/03; H02K 41/031; Y10T 29/49009; Y10T 29/49012
USPC .................................................. 29/596, 598
See application file for complete search history.

(56) References Cited

U.S. PATENT DOCUMENTS

| | | | |
|---|---|---|---|
| 8,076,815 B2 | 12/2011 | Freudenberg et al. | |
| 8,508,095 B2* | 8/2013 | Husband | H02K 21/44 310/181 |
| 2009/0243415 A1* | 10/2009 | Hoppe | H02K 1/08 29/596 |

FOREIGN PATENT DOCUMENTS

| | | |
|---|---|---|
| JP | 2010-504071 A | 2/2010 |
| JP | 2016-7132 A | 1/2016 |
| WO | WO 2013/157165 A1 | 10/2013 |

* cited by examiner

PERMANENT MAGNET SYNCHRONOUS MACHINE AND METHOD FOR MANUFACTURING PERMANENT MAGNET SYNCHRONOUS MACHINE STATOR

TECHNICAL FIELD

The present invention relates to a permanent magnet synchronous machine that attains reduction in size of a motor by increasing torque density, and to a method of manufacturing a stator of the permanent magnet synchronous machine.

BACKGROUND ART

In a rotary machine such as an industrial motor or an in-vehicle motor, reduction in size, increase in speed, and increase in range of rotation speed during use are required to be achieved. As a rotary machine meeting such requirement, there has been proposed a rotary machine having a rotor structure in which a simple and robust motor structure is employed, and having a structure in which armature windings and permanent magnets are used in a stator (see, for example, Patent Literatures 1 and 2).

CITATION LIST

Patent Literature

[PTL 1] JP 2002-199679 A
[PTL 2] JP 2010-504071 A1

SUMMARY OF INVENTION

Technical Problem

However, the related arts have the following problems.

In the related-art configuration of, for example, Patent Literature 1, the permanent magnets are each embedded in a center portion of the stator tooth, and the permanent magnets are not embedded near a core back portion. Therefore, there is a problem in that a magnetic flux is short-circuited on a rotor opposite-side of the permanent magnet in a radial direction, that is, a side opposite to the rotor, which results in reduction in torque density.

Further, in the integrated stator core, it is required to perform winding after the magnet is embedded in the center portion of the tooth. As a result, it is difficult to wind a winding at high density.

Further, in Patent Literature 2, a structure of one tooth portion is provided so that a winding can be wound at high density. However, the magnet is embedded between the split teeth. Therefore, when the winding is wound at a high space factor in order to reduce winding resistance, it is required to apply tension to the winding. As a result, there is a fear in that the magnet between the two split teeth may be cracked and chipped due to tight winding of the winding.

Further, in Patent Literature 2, magnet powder is used. Therefore, in order to prevent drop of powder from the teeth, the core sandwiching the magnet is required to have portions entirely held in contact with the magnet in the axial direction.

The present invention has been made in order to solve the problems as described above, and has an object to provide a permanent magnet synchronous machine, which is capable of preventing cracking and chipping of a magnet between split teeth by suppressing a force applied to the magnet when a winding is wound, and a method of manufacturing a stator of the permanent magnet synchronous machine.

Solution to Problem

According to one embodiment of the present invention, there is provided a permanent magnet synchronous machine, including a stator including a plurality of split core blocks that are continuously arranged in a rotation direction of a rotor, the plurality of split core blocks each including: a permanent magnet; a pair of teeth arranged on both ends of the permanent magnet so as to sandwich the permanent magnet in the rotation direction; and connection teeth, which are provided on axial end portions of the pair of teeth sandwiching the permanent magnet, and are configured to connect the pair of teeth.

Further, according to one embodiment of the present invention, a method of manufacturing the stator of the permanent magnet synchronous machine includes a step of connecting magnetic steel plates of the each of the pair of teeth to each other through an operation of stacking the magnetic steel plates for the each of the pair of teeth and thereafter forming the each of the pair of teeth to have caulked portions through use of a die when the pair of teeth are to be formed by stacking the magnetic steel plates.

Advantageous Effects of Invention

According to one embodiment of the present invention, the teeth sandwiching the magnet are split perpendicularly to a direction of the magnetic flux from the magnet. Thus, a structure with a small leakage magnetic flux and a high torque density of the motor can be attained. Further, the teeth each having a different structure from those of the teeth sandwiching the magnet are provided at parts of the stator in the axial direction to be connected astride the magnet. As a result, it is possible to provide the permanent magnet synchronous machine, which is capable of preventing cracking and chipping of the magnet between the split teeth by suppressing the force applied to the magnet when the winding is wound, and the method of manufacturing a stator of the permanent magnet synchronous machine.

DESCRIPTION OF EMBODIMENTS

Now, a permanent magnet synchronous machine and a method of manufacturing a stator of the permanent magnet synchronous machine according to preferred embodiments of the present invention are described with reference to the drawings.

The present invention has the following technical feature in a so-called permanent magnet synchronous machine. Specifically, windings are wound in the stator in which magnets are embedded. In a tooth portion in which the magnet is embedded, teeth adjacent to each other across the magnet are not connected to each other, teeth each having a different structure from those of the adjacent teeth are provided and connected astride the magnet in an axial direction, and the winding is wound.

First Embodiment

Figure 1:
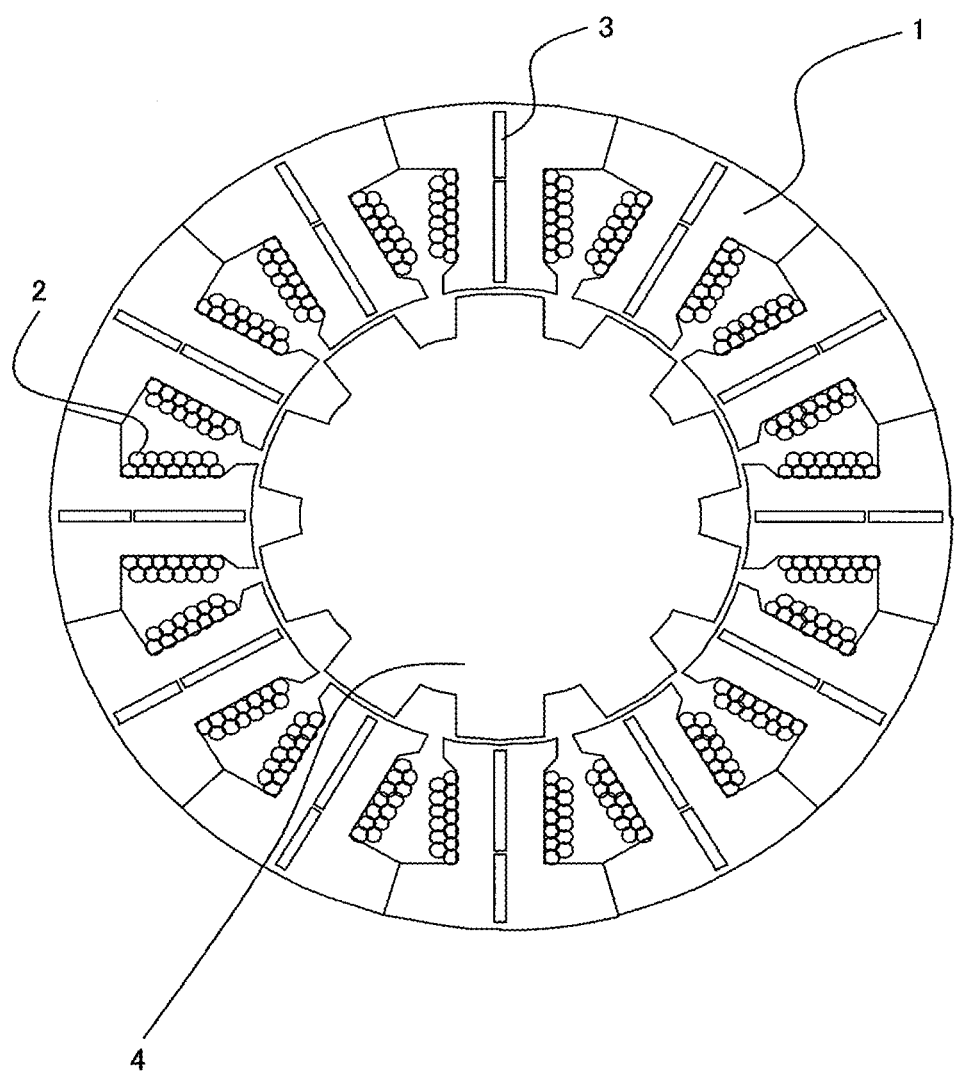
FIG. 1 is a sectional view of a permanent magnet synchronous machine of a rotary type according to a first embodiment of the present invention.

FIG. 1 is a sectional view of a permanent magnet synchronous machine of a rotary type according to a first embodiment of the present invention. In FIG. 1, a depth direction corresponds to an axial direction, and a direction of expanding from a center of a rotor to an outer side corresponds to a radial direction. The permanent magnet synchronous machine according to the present invention illustrated in FIG. 1 includes a stator core 1, windings 2, permanent magnets 3, and a rotor core 4. In FIG. 1, a rotary electric machine in which the number of salient poles of the rotor is ten, and the number of tooth portions of the stator and the number of the magnets are twelve are exemplified. The stator core 1 illustrated in FIG. 1 includes a plurality of split core blocks 10.

Figure 2:
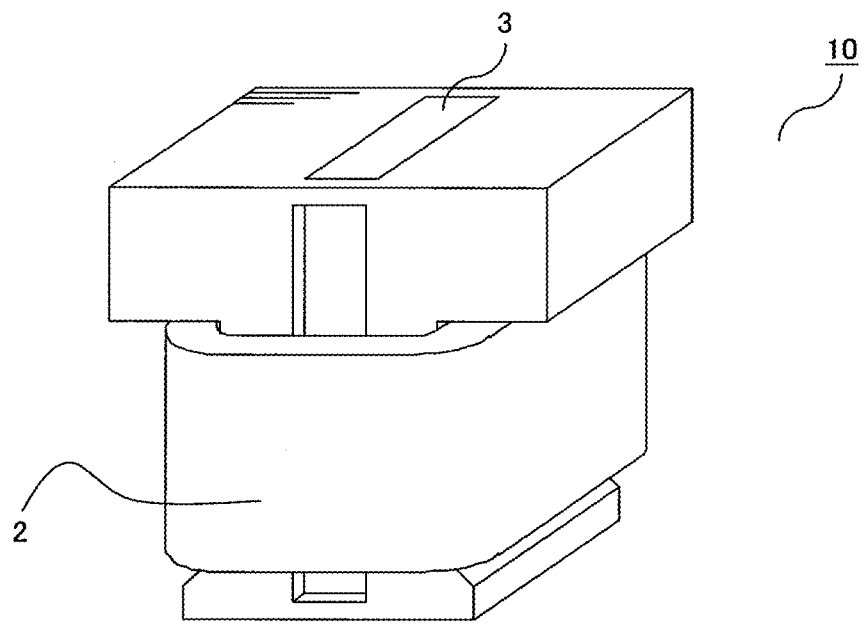
FIG. 2 is a view for illustrating a configuration of a split core block of the permanent magnet synchronous machine according to the first embodiment of the present invention.

Further, FIG. 2 is a view for illustrating a configuration of the split core block 10 of the permanent magnet synchronous machine according to the first embodiment of the present invention. In the split core block 10, the winding 2 is wound around a tooth portion in which the permanent magnet 3 is sandwiched.

Figure 3:
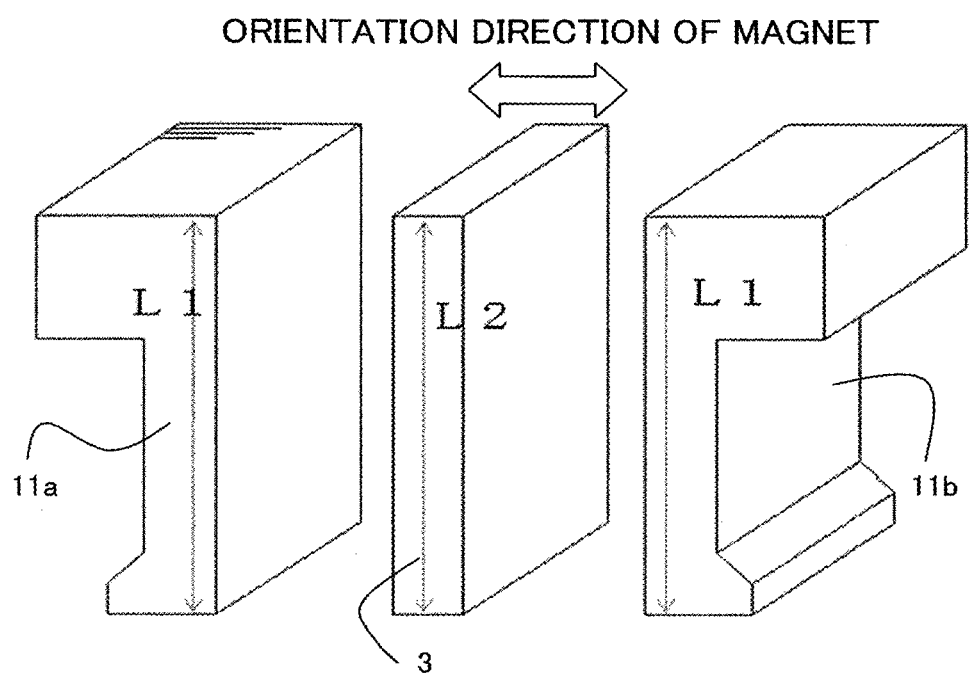
FIG. 3 is a configuration view of a tooth portion included in the split core block in the first embodiment of the present invention.
Figure 4:
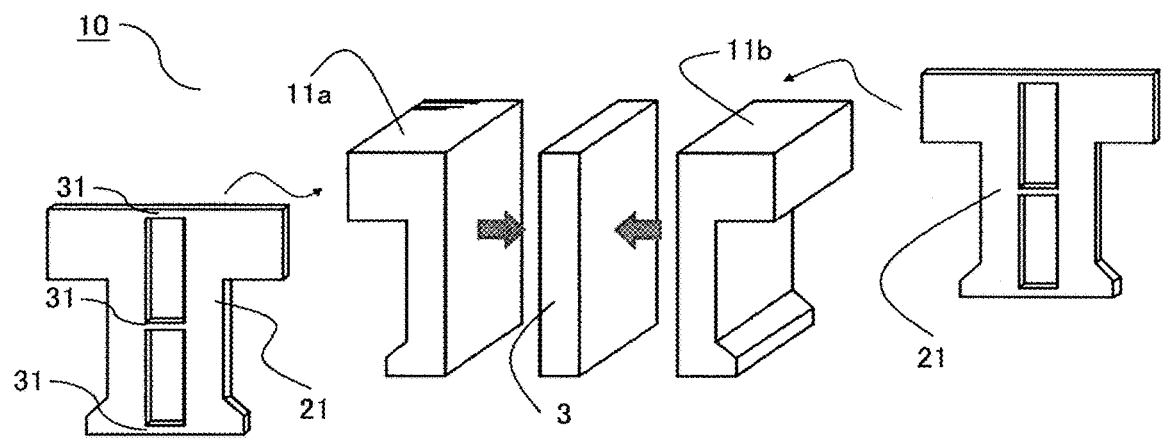
FIG. 4 is an explanatory view for illustrating assembly of teeth included in the split core block in the first embodiment of the present invention.

Next, with reference to FIG. 3 and FIG. 4, a configuration of the tooth portion is described in detail. FIG. 3 is a configuration view of the tooth portion included in the split core block 10 in the first embodiment of the present invention.

As illustrated in FIG. 3, the tooth portion forming one split core block 10 is split into a tooth 11*a* and a tooth 11*b* in a direction perpendicular to a rotation direction. Further, the permanent magnet 3 is sandwiched between the split teeth.

The tooth 11*a* and the tooth 11*b* are each formed of laminated steel plates, and formed by stacking thin steel plates. The permanent magnet 3 is arranged in the tooth portion at a center portion or a center position between the teeth 11*a* and 11*b*, and is magnetized in a direction indicated in FIG. 3. Further, the permanent magnets are arranged so that a magnetization direction, that is, an orientation direction of the permanent magnets adjacent to each other in a circumferential direction are opposite to each other in the circumferential direction. That is, the permanent magnets are arranged so that N-poles are opposed to each other and S-poles are opposed to each other.

Further, in FIG. 3, a length L1 of each of the teeth 11*a* and 11*b* and a length L2 of the permanent magnet 3 in the radial direction from a gap surface between the rotor and the stator have a relationship of L1=L2. As a result, a larger amount of a magnetic flux from the magnet can be obtained, thereby being capable of increasing an output.

Next, FIG. 4 is an explanatory view for illustrating assembly of the teeth included in the split core block 10 in the first embodiment of the present invention. Connection teeth 21 each having a different shape from those of the teeth 11*a* and 11*b* are provided on both end portions of the tooth portion illustrated in FIG. 3 in the axial direction. As illustrated in FIG. 4, in each of the connection teeth 21 each having the different shape, in order to prevent a leakage magnetic flux, connecting portions 31 are formed to be thin. When the thickness of each of the connecting portions 31 is large, the leakage magnetic flux is increased, which results in reduction in torque. Further, in FIG. 4, the connection teeth 21 are provided on both the end portions of the split core block in the axial direction. In FIG. 4, the connection teeth 21 are provided on both ends of the split core block in the axial direction, but the present invention is not particularly limited to this structure.

When the permanent magnet 3 is sandwiched between the split teeth 11*a* and 11*b*, and the winding 2 is wound around the teeth 11*a* and 11*b*, in order to wind a larger number of turns of the winding 2, the winding 2 is wound while being applied with tension. Therefore, the permanent magnet 3 sandwiched between the tooth 11*a* and the tooth 11*b* receives stress to be chipped and cracked. When the permanent magnet 3 is chipped and cracked, and the chipped and cracked portions are removed from the synchronous machine, the magnetic flux from the permanent magnet 3 is reduced, with the result that the output is reduced.

Therefore, in the first embodiment, the members corresponding to the teeth 21 are mounted to both the end portions of the split core block in the axial direction, and then the winding is wound. With such structure, the bridges 31 being the thin connecting portions of the tooth 21 prevent tight winding by the winding 2, thereby being capable of reducing stress applied to the permanent magnet 3.

Further, the teeth 21 are each formed of the same magnetic steel plates as those of the teeth 11*a* and 11*b*. Thus, material cost can be reduced. Further, when the strength is required, only the teeth 21 may each be formed of, for example, a steel plate cold commercial (SPCC) different in thickness from those of the teeth 11*a* and 11*b* instead of thin magnetic steel plates.

Further, when only the teeth 21 are each formed of a non-magnetic material in order to reduce the leakage magnetic flux, the output can be increased.

As described above, according to the first embodiment, parts of the core sandwiching the permanent magnet are connected by the bridges. As a result, when the winding is wound around the core sandwiching the permanent magnet, a force applied due to tight winding in a direction perpendicular to the gap surface can be received by the portions corresponding to the bridges. Thus, a force applied to the magnet can be suppressed, thereby being capable of preventing chipping and cracking of the magnet.

Second Embodiment

Figure 5:
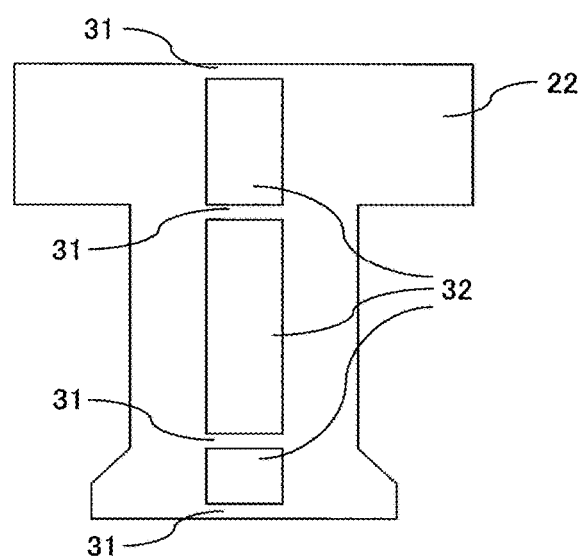
FIG. 5 is a view for illustrating a configuration of a tooth provided on each of both end portions of the split core block in an axial direction of a permanent magnet synchronous machine according to a second embodiment of the present invention.

FIG. 5 is a view for illustrating a configuration of a tooth 22 provided on each of both end portions of the split core block in an axial direction of a permanent magnet synchronous machine according to a second embodiment of the present invention. In the above-mentioned first embodiment, the bridges 31 being the thin portions in the tooth 21 are formed at three positions as illustrated in FIG. 4.

In contrast, in the tooth 22 in the second embodiment, as illustrated in FIG. 5, air gaps 32 are formed at three positions so that the bridges 31 are formed at four positions. In this manner, the number of the portions corresponding to the bridges is increased so that the strength against tight winding of the winding can be increased. In FIG. 5, the portions corresponding to the bridges are formed at four positions, but the number of the portions corresponding to the bridges is not limited thereto.

As described above, according to the second embodiment, the number of the bridges is suitably set depending on usage. Thus, a tooth structure having desired strength against tight winding of the winding can be attained.

Third Embodiment

Figure 6:
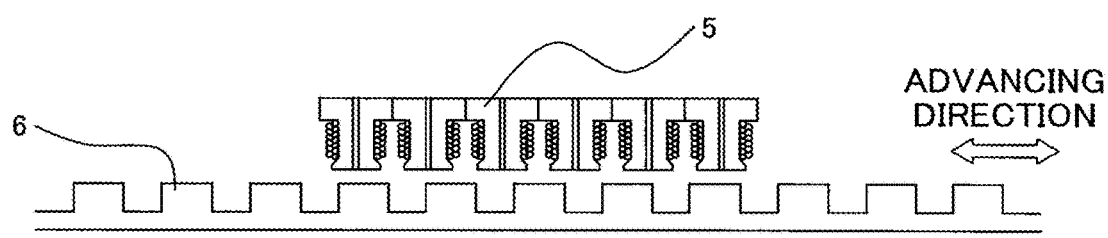
FIG. 6 is a sectional view of a permanent magnet synchronous machine of a linear type according to a third embodiment of the present invention.

FIG. 6 is a sectional view of a permanent magnet synchronous machine of a linear type according to a third embodiment of the present invention. In the linear type, as illustrated in FIG. 6, the stator performs linear motion in a transverse direction as an advancing direction. A configuration of the tooth portion around which the winding 2 is wound is similar to that in the above-mentioned first embodiment. In a general linear motor, permanent magnets are used in a stator 6. Therefore, the magnets are required in accordance with a movement distance of a movable element 5. Thus, a large number of the magnets to be used in the stator is required, which results in increase in cost.

In contrast, as illustrated in FIG. 6, the tooth structure including the permanent magnets in the present invention is applied to the movable element 5 of the linear motor. Thus, the stator 6 can be formed of thin magnetic steel plates without using the permanent magnet. As a result, the linear motor can be reduced in cost.

As described above, according to the third embodiment, the tooth structure in the present invention is applied to the linear motor. Thus, the configuration including the permanent magnets only on a drive side can be provided. Therefore, as compared to the linear motor including the permanent magnets in the stator, when the movement distance is increased, the number of the permanent magnets can be reduced, thereby being capable of reducing cost.

Fourth Embodiment

Figure 7:
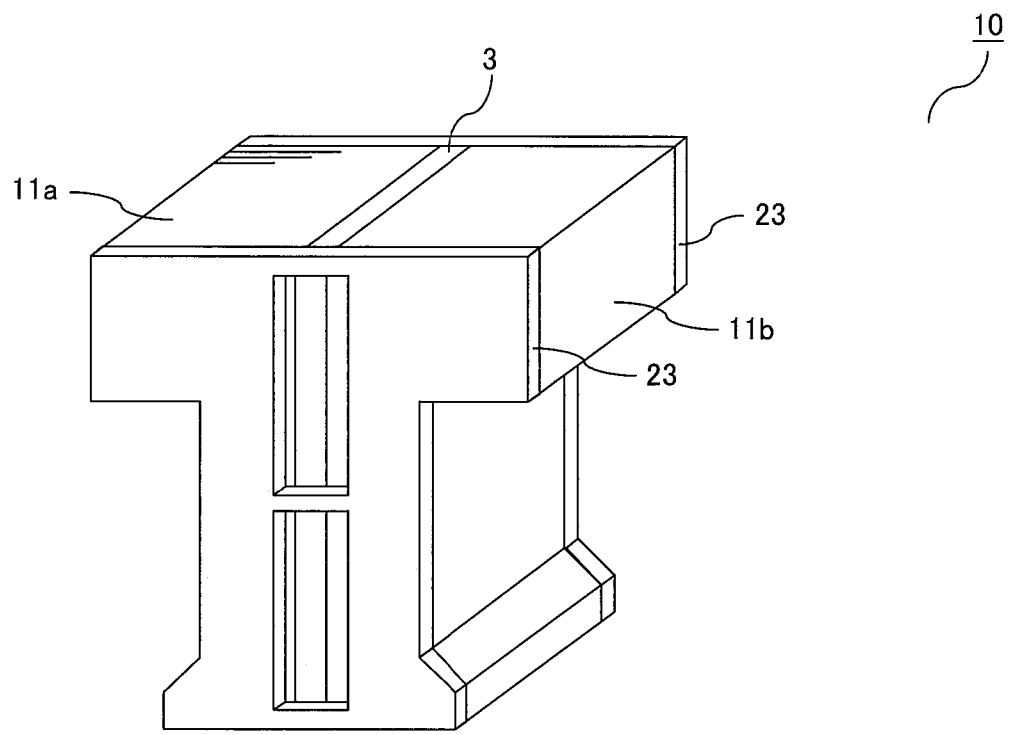
FIG. 7 is a view for illustrating a configuration of the split core block in a permanent magnet synchronous machine of a rotary type according to a fourth embodiment of the present invention.
Figures 8A, 8B:
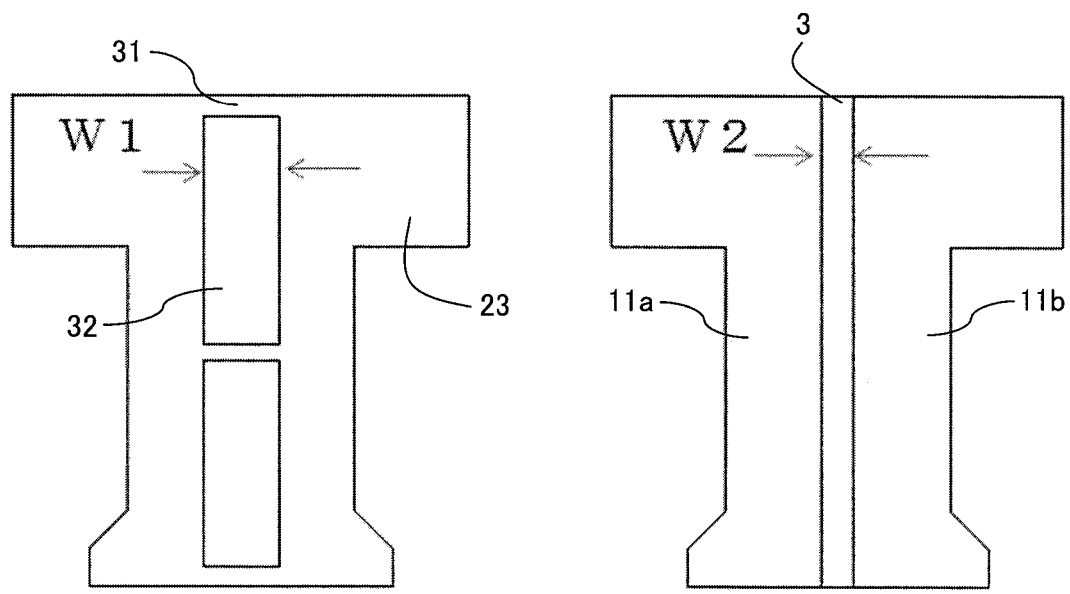
FIG. 8A is an explanatory view for illustrating a tooth structure of the split core block in the fourth embodiment of the present invention.
FIG. 8B is an explanatory view for illustrating a tooth structure of the split core block in the fourth embodiment of the present invention.

FIG. 7 is a view for illustrating a configuration of the split core block 10 in a permanent magnet synchronous machine of a rotary type according to a fourth embodiment of the present invention. Further, FIGS. 8A and 8B are explanatory views for illustrating a tooth structure of the split core block 10 in the fourth embodiment of the present invention. More specifically, FIG. 8A is a view for illustrating a shape of a tooth 23 provided on an end portion of the split core block in the axial direction. Further, FIG. 8B is a view for illustrating a state in which the two split teeth 11a and 11b forming the split core block 10 in FIG. 7 sandwich the permanent magnet 3.

In FIGS. 8A and 8B, a width W1 of a portion corresponding to each of the bridges 31 in the tooth 23 and a magnet width W2 of the permanent magnet 3 have a relationship of W1>W2.

With such relationship, a contact area between members such as magnetic steel plates in FIG. 8A and the magnet can be reduced. Therefore, a leakage magnetic flux at portions corresponding to the bridges 31 of the tooth 23 can be reduced, thereby being capable of suppressing reduction in output. Further, as in the above-mentioned first embodiment, the teeth 23 are each formed of the same magnetic steel plates as those of the teeth 11a and 11b sandwiching the permanent magnet 3, thereby being capable of reducing material cost.

Further, when the strength is required, only the teeth 23 may each be formed of, for example, SPCC different in thickness from those of the teeth 11a and 11b instead of thin magnetic steel plates. Further, when only the teeth 23 are each formed of a non-magnetic material in order to reduce the leakage magnetic flux, the output can be increased.

As described above, according to the fourth embodiment, the width of each of the portions corresponding to the bridges is larger than the width of the permanent magnet in an orientation direction. As a result, the leakage magnetic flux can be reduced, thereby being capable of suppressing reduction in output.

Fifth Embodiment

Figure 9:
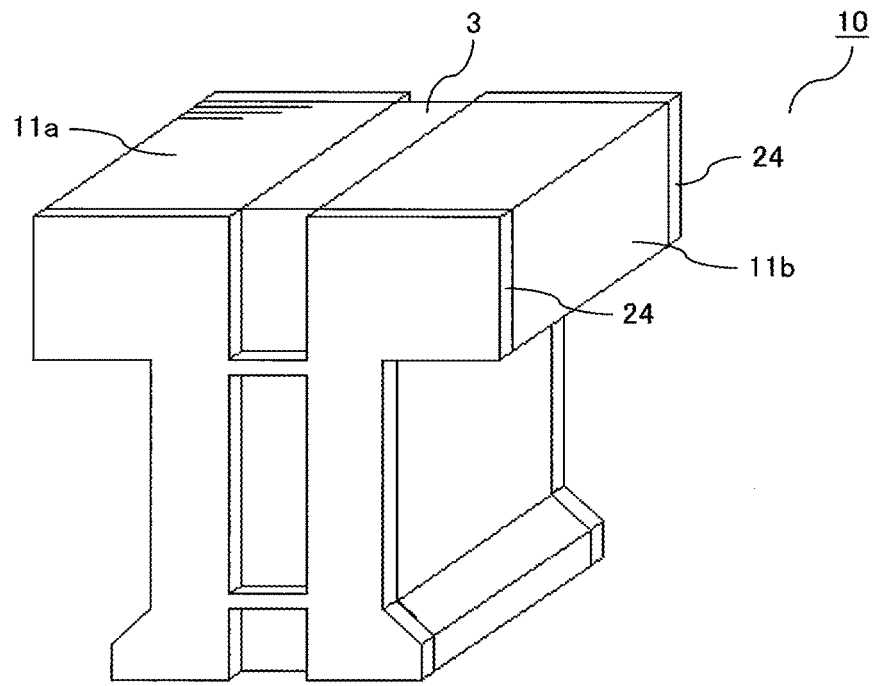
FIG. 9 is a view for illustrating a configuration of the split core block in a permanent magnet synchronous machine of a rotary type according to a fifth embodiment of the present invention.

FIG. 9 is a view for illustrating a configuration of the split core block 10 in a permanent magnet synchronous machine of a rotary type according to a fifth embodiment of the present invention. Further, FIG. 10 is an explanatory view for illustrating a tooth structure arranged on each of end portions of the split core block 10 in the axial direction in the fifth embodiment of the present invention.

Figure 10:
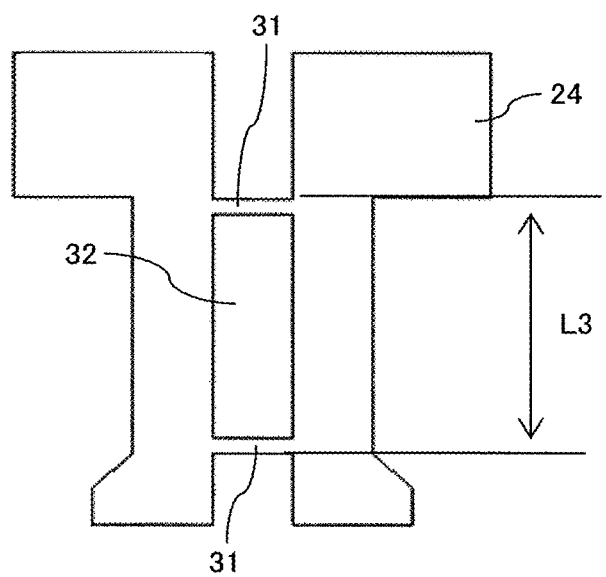
FIG. 10 is an explanatory view for illustrating a tooth structure arranged on each of end portions of the split core block in the axial direction in the fifth embodiment of the present invention.

As illustrated in FIG. 10, in a tooth 24 provided on each of the end portions of the split core block in the axial direction in the fifth embodiment, portions corresponding to the thin bridges 31 are formed at two positions to reduce the number of the portions corresponding to the bridges from that in the above-mentioned first embodiment. Further, the bridges 31 are arranged in a portion L3 at which the winding 2 is wound. Thus, the strength of the magnet against tight winding of the winding 2 can be increased.

Further, the tooth 24 is divided at a tooth distal end portion. A leakage magnetic flux at the tooth distal end portion leads to reduction in magnetic flux density in air gaps. Therefore, the tooth distal end portion is divided so that the leakage magnetic flux can be reduced, thereby being capable of increasing the output.

Figure 11:
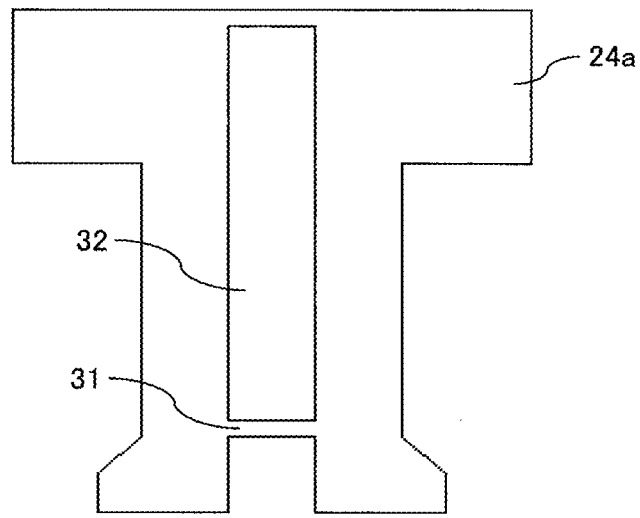
FIG. 11 is an explanatory view for illustrating a tooth structure different from that in FIG. 10, which is arranged on each of the end portions of the split core block in the axial direction in the fifth embodiment of the present invention.

Further, FIG. 11 is an explanatory view for illustrating a tooth structure different from that in FIG. 10, which is arranged on each of the end portions of the split core block 10 in the axial direction in the fifth embodiment of the present invention. More specifically, in a tooth 24a illustrated in FIG. 11, the bridges 31 being thin connecting portions are formed on an end portion at a core back portion and in a portion at which the winding is wound.

Figure 12:
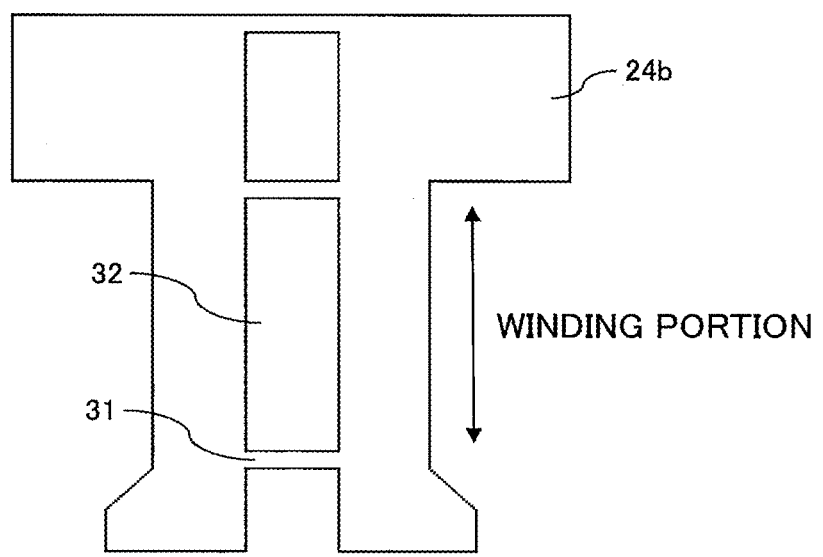
FIG. 12 is an explanatory view for illustrating a tooth structure different from those in FIG. 10 and FIG. 11, which is arranged on each of the end portions of the split core block in the axial direction in the fifth embodiment of the present invention.

Further, FIG. 12 is an explanatory view for illustrating a tooth structure different from those in FIG. 10 and FIG. 11, which is arranged on each of the end portions of the split core block 10 in the axial direction in the fifth embodiment of the present invention. More specifically, in a tooth 24b illustrated in FIG. 12, the bridges 31 being thin connecting portions are formed at two positions in the portion at which the winding is wound in FIG. 11.

As described above, according to the fifth embodiment, the number of the portions corresponding to the bridges is changed depending on the required strength. Thus, cracking or the like of the magnet by tight winding of the winding can be prevented.

Sixth Embodiment

Figure 13:
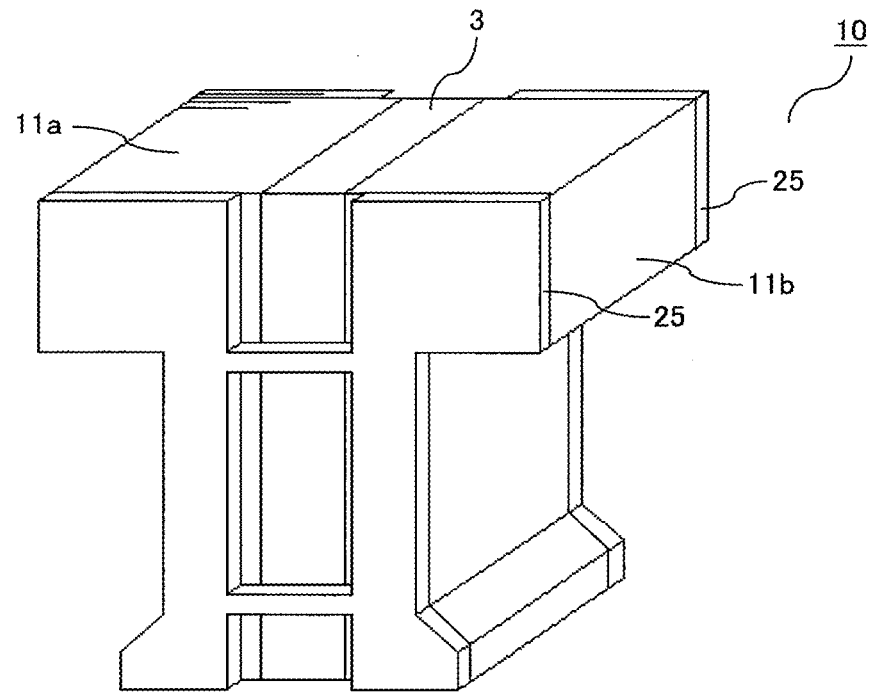
FIG. 13 is a view for illustrating a configuration of the split core block in a permanent magnet synchronous machine of a rotary type according to a sixth embodiment of the present invention.

FIG. 13 is a view for illustrating a configuration of the split core block 10 in a permanent magnet synchronous machine of a rotary type according to a sixth embodiment of the present invention. In the configuration in FIG. 13, the relationship between the width W1 of each of the bridges 31 and the magnet width W2, which is described in the above-mentioned third embodiment with reference to FIGS. 8A and 8B, is W1>W2, and teeth 25 each having the bridges 31 formed in the portion at which the winding 2 is wound as described in the above-mentioned fifth embodiment are used.

As described above, according to the sixth embodiment, the leakage magnetic flux at the portions corresponding to the bridges can be reduced, thereby being capable of increasing the output.

Seventh Embodiment

Figure 14:
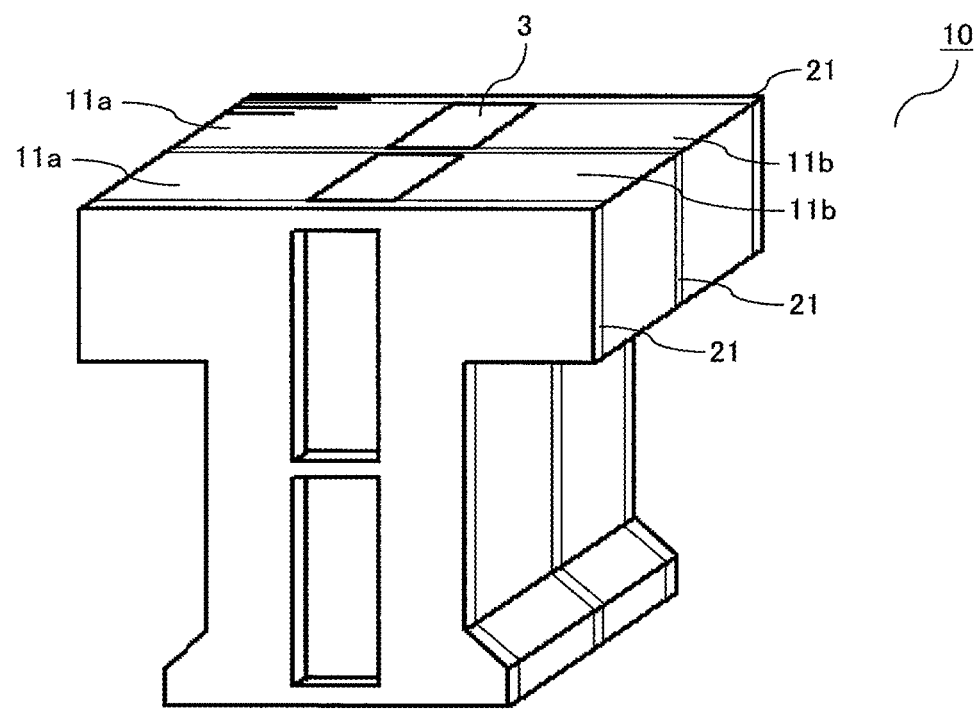
FIG. 14 is a view for illustrating a configuration of the split core block in a permanent magnet synchronous machine of a rotary type according to a seventh embodiment of the present invention.

FIG. 14 is a view for illustrating a configuration of the split core block 10 in a permanent magnet synchronous machine of a rotary type according to a seventh embodiment of the present invention. Further, FIG. 15 is an explanatory view for illustrating assembly of teeth included in the split core block 10 in the seventh embodiment of the present invention.

Figure 15:
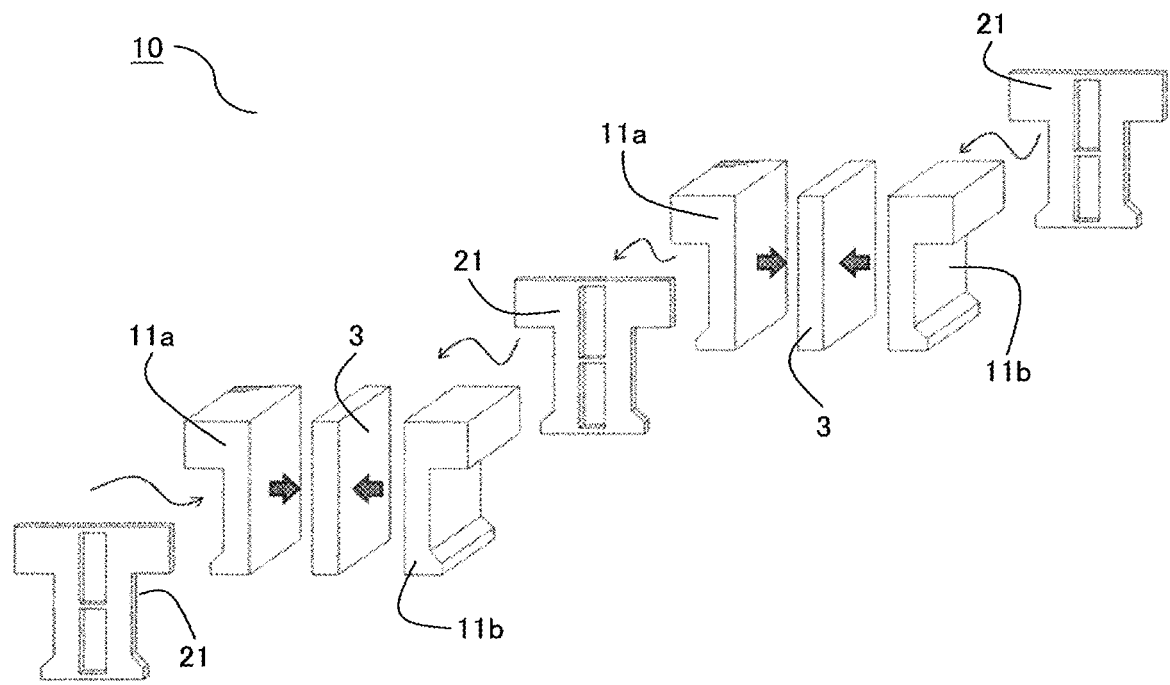
FIG. 15 is an explanatory view for illustrating assembly of teeth included in the split core block in the seventh embodiment of the present invention.

As illustrated in FIG. 14 and FIG. 15, in a tooth structure in the seventh embodiment, the teeth 21 in the above-mentioned first embodiment are provided not only on both the end portions of the split core block in the axial direction, but at a plurality of positions. The teeth 21 are provided at the plurality of positions in this manner so that the permanent magnet 3 is split. As a result, an eddy current is reduced, and the number of the teeth 21 having thin connecting portions is increased, thereby increasing the strength.

As described above, according to the seventh embodiment, the teeth each having the bridges are also provided on a portion other than the end portions of the split core block in the axial direction, and the permanent magnet is split. As a result, the eddy current can be reduced, and the strength of teeth can also be increased.

Eighth Embodiment

Figure 16:
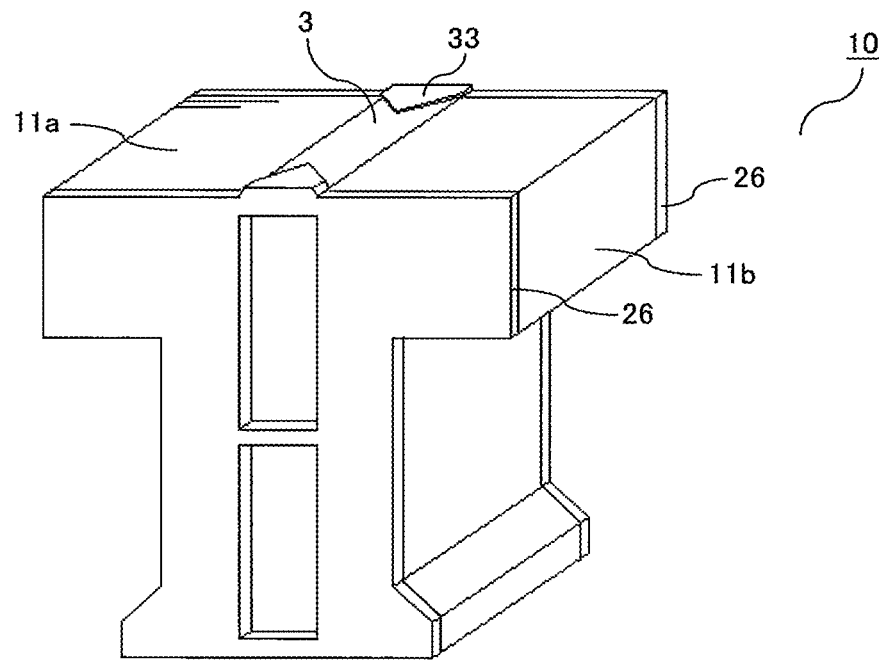
FIG. 16 is a view for illustrating a configuration of the split core block in a permanent magnet synchronous machine of a rotary type according to an eighth embodiment of the present invention.

FIG. 16 is a view for illustrating a configuration of the split core block 10 in a permanent magnet synchronous machine of a rotary type according to an eighth embodiment of the present invention. Further, FIG. 17 is an explanatory view for illustrating a tooth structure arranged on each of end portions of the split core block 10 in the axial direction in the eighth embodiment of the present invention.

Figure 17:
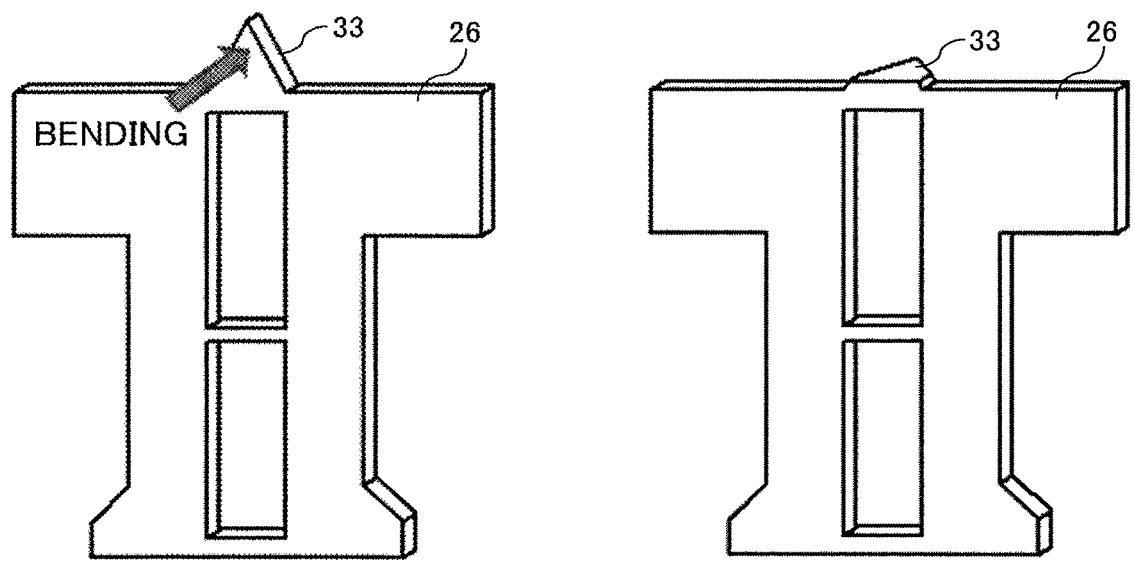
FIG. 17 is an explanatory view for illustrating a tooth structure arranged on each of end portions of the split core blocks in the axial direction in the eighth embodiment of the present invention.

As illustrated in FIG. 17, a tooth 26 provided on each of the end portions of the split core block in the axial direction in the eighth embodiment has a protrusion preventing portion 33. The tooth 26 having a mechanism of the protrusion preventing portion 33 as illustrated in FIG. 17 is manufactured through use of a die or the like, and the mechanism of the protrusion preventing portion 33 is bent. The protrusion preventing portion 33 having a structure of being partially bent is formed on each of both the end portions of the split core block in the axial direction. Thus, protrusion of the permanent magnet 3 in the radial direction can be prevented.

In FIG. 16, the protrusion preventing portion 33 is formed on the radially outer side, that is, the outer peripheral surface side of the core back. However, when the protrusion preventing portion 33 is formed on the gap surface side of the stator opposed to the outer peripheral surface of the rotor, protrusion toward the gap surface side is prevented. Further, when the protrusion preventing portions 33 are formed on both the sides, that is, the radially outer side and the gap surface side, protrusion from both the sides can be prevented.

As described above, according to the eighth embodiment, the tooth provided on each of the end portions of the split core block in the axial direction has the protrusion preventing portion. As a result, protrusion of the magnet toward the core back side or the gap surface side can be prevented.

Ninth Embodiment

Figure 18:
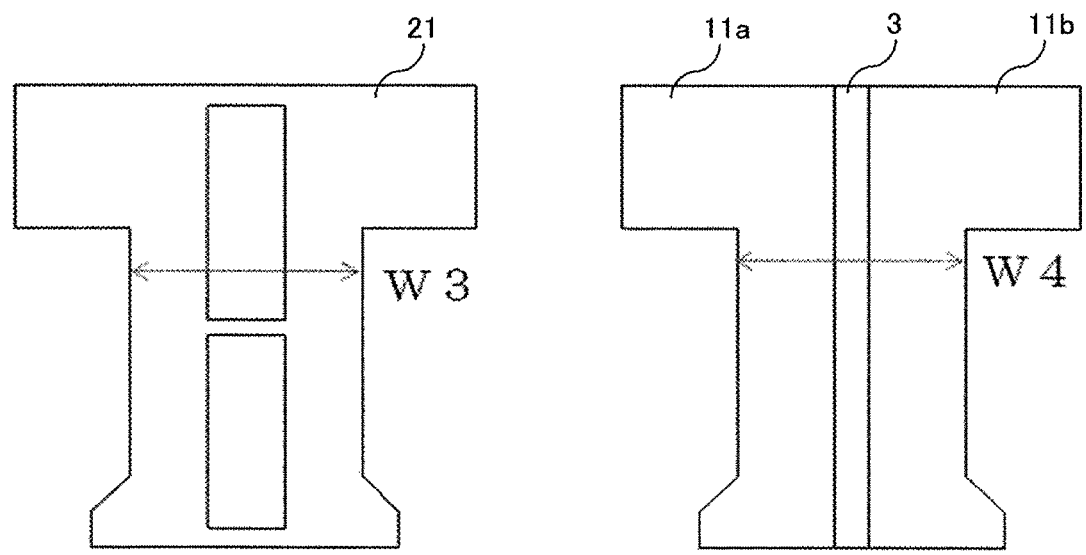
FIG. 18 is an explanatory view for illustrating a tooth structure of the split core block in a ninth embodiment of the present invention.

FIG. 18 is an explanatory view for illustrating a tooth structure of the split core block 10 in a ninth embodiment of the present invention. Assuming that, as illustrated in FIG. 18, a tooth width of the tooth 21 arranged on each of the end portions of the split core block in the axial direction is defined as W3, and a width of a combined part of the split teeth 11a and 11b and the permanent magnet 3 is defined as W4, the widths have a relationship of W3>W4.

That is, the width W3 of the tooth 21 illustrated in FIG. 18 in the rotation direction in a portion at which the winding is wound is set to be larger than the width W4 of the pair of teeth 11a and 11b in the rotation direction in the state of sandwiching the permanent magnet 3.

With the relationship of W3>W4, the winding 2 can be wound without applying a force due to tight winding from the winding 2 to the teeth 11a and 11b.

As described above, according to the ninth embodiment, the teeth that satisfy the relationship of W3>W4 are used on the end portions of the split core block in the axial direction. Thus, the force from the winding generated due to tight winding can be prevented from being applied to the permanent magnet. As a result, cracking and chipping of the magnet can be prevented.

Tenth Embodiment

Figure 19:
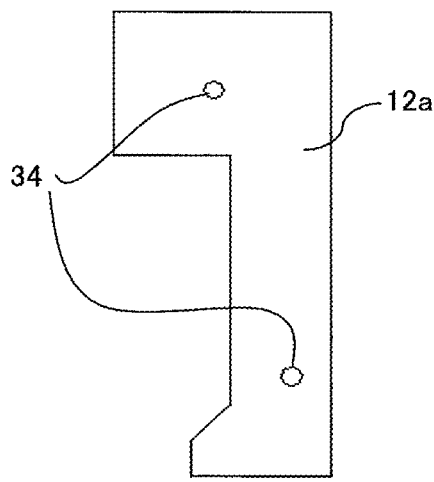
FIG. 19 is a view for illustrating a configuration of a tooth in a permanent magnet synchronous machine of a rotary type in a tenth embodiment of the present invention.

FIG. 19 is a view for illustrating a configuration of a tooth 12a in a permanent magnet synchronous machine in a tenth embodiment of the present invention. More specifically, caulked portions 34 are formed in the tooth 12a in the tenth embodiment.

Punching is performed through use of a die, and pressing is performed. Thus, a gripping force in the axial direction can be imparted to the caulked portions. As a result, at the time of manufacture, handling of one tooth becomes easy.

Figure 20:
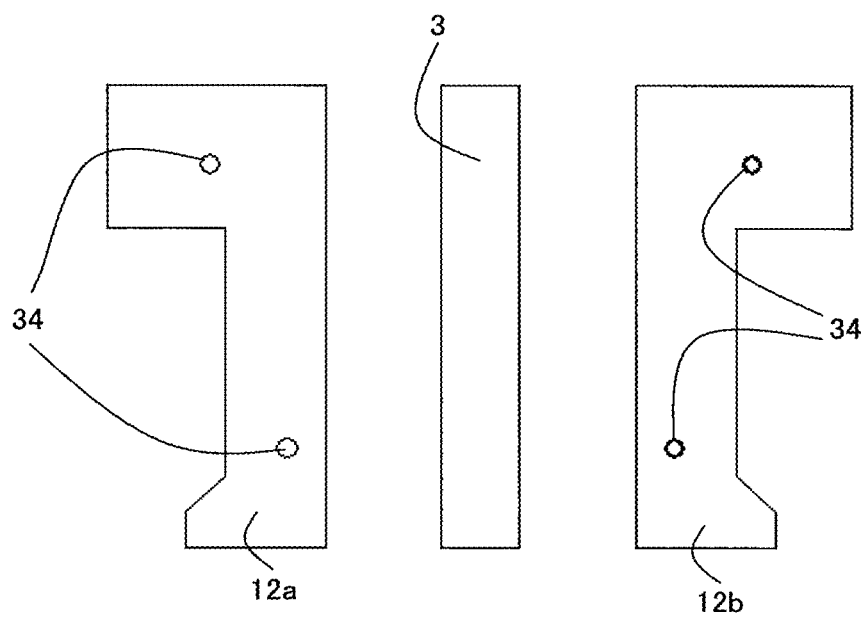
FIG. 20 is a configuration view of a tooth portion included in the split core block in the tenth embodiment of the present invention.

Further, FIG. 20 is a configuration view of a tooth portion included in the split core block 10 in the tenth embodiment of the present invention. A tooth 12b illustrated in FIG. 20 has a structure in which the tooth 12a is reversed, and the two teeth 12a and 12b are used in combination. The teeth 12a and 12b are used in this manner. Thus, the size of the die is reduced, thereby being capable of reducing cost of the die.

In FIG. 19, the caulked portions 34 are formed at two positions. However, the number of the caulked portions 34 is not limited to two, and the caulked portions 34 may be formed at three or more positions in order to increase the gripping force.

Further, instead of the caulked portions 34 in the tenth embodiment, the teeth may be fixed in the axial direction by fixing means in the axial direction such as adhesion or bolts.

As described above, according to the tenth embodiment, the pair of teeth sandwiching the permanent magnet each have means capable of fixing steel plates stacked in the axial direction. As a result, the gripping force in the axial direction can be imparted.

Eleventh Embodiment

Figure 21:
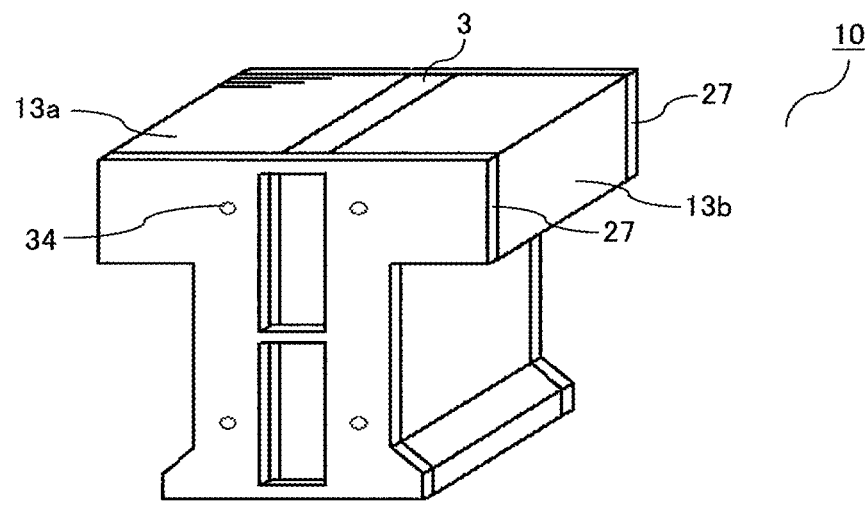
FIG. 21 is a view for illustrating a configuration of the split core block in a permanent magnet synchronous machine of a rotary type according to an eleventh embodiment of the present invention.

FIG. 21 is a view for illustrating a configuration of the split core block 10 in a permanent magnet synchronous machine of a rotary type according to an eleventh embodiment of the present invention. In the eleventh embodiment, the caulked portions 34 are formed also in a tooth 27 arranged on each of the end portions of the split core block in the axial direction.

Figure 22:
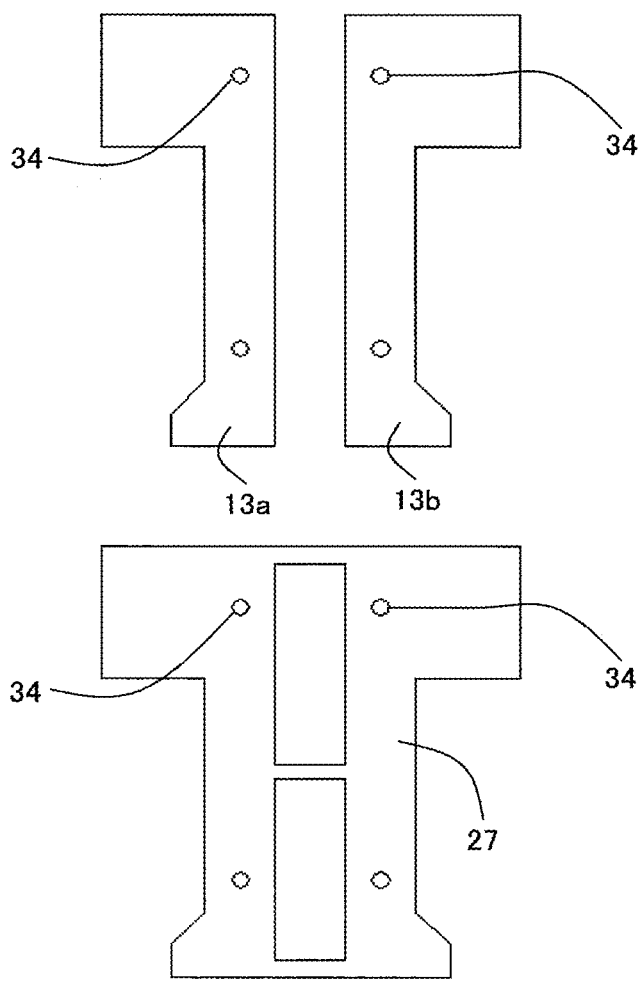
FIG. 22 is an explanatory view for illustrating structures of teeth arranged on both sides of a permanent magnet and a tooth arranged on each of end portions of the split core block in the axial direction in the eleventh embodiment of the present invention.

Further, FIG. 22 is an explanatory view for illustrating structures of teeth 13a and 13b arranged on both sides of the permanent magnet and the tooth 27 arranged on each of end portions of the split core block 10 in the axial direction in the eleventh embodiment of the present invention. The connected teeth 27 are punched out. Further, the teeth 13a and 13b are punched out through use of a die, and then are gripped in the axial direction through the caulked portions 34. Finally, the teeth 27 are mounted. In this manner, the split core block 10 is formed.

Figure 23:
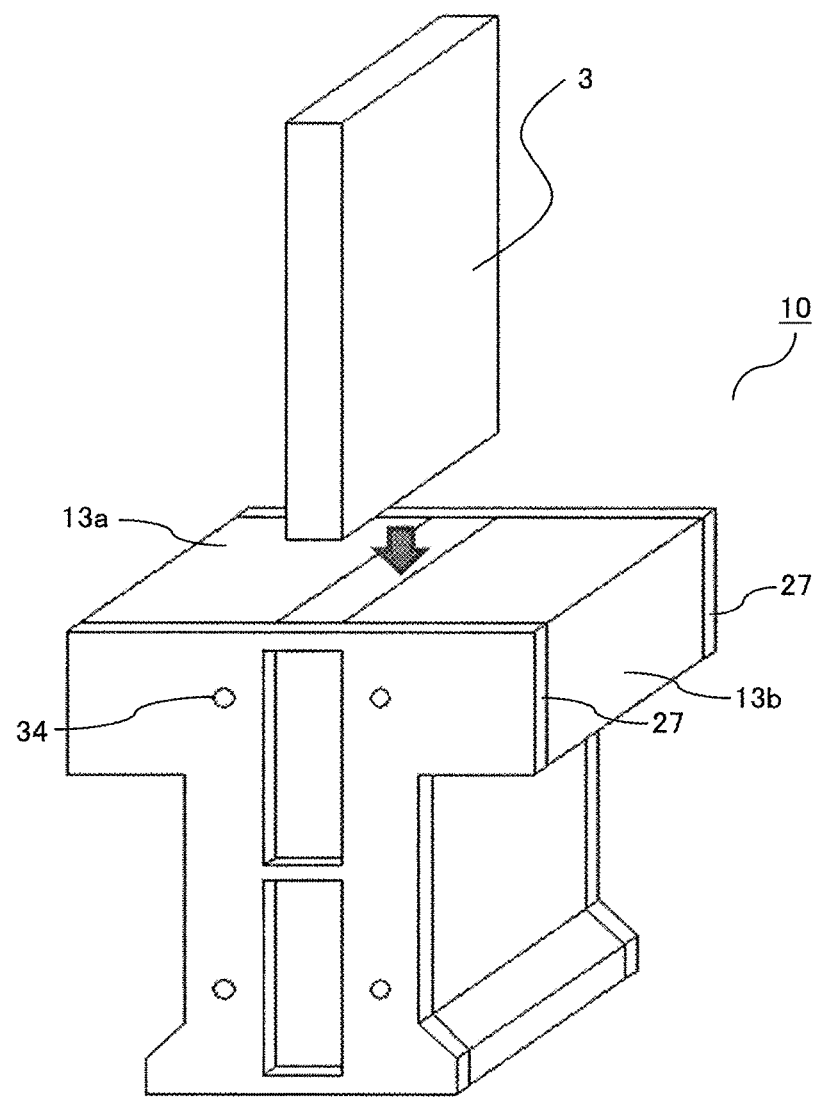
FIG. 23 is an explanatory view for illustrating insertion of the magnet to the teeth manufactured by punching in FIG. 22 in the eleventh embodiment of the present invention.

Further, FIG. 23 is an explanatory view for illustrating insertion of the magnet to the tooth portion manufactured by punching in FIG. 22 in the eleventh embodiment of the present invention. As illustrated in FIG. 22, when the teeth are manufactured through use of the die, the teeth 13a and 13b and the teeth 27 can be manufactured by being punched out with the same die. As a result, the teeth 13a and 13b and the teeth 27 can be stacked by a progressive press through the same operation, thereby being capable of shortening manufacture time. Further, the teeth can be gripped also in the axial direction through the caulked portions, thereby enhancing ease of manufacture.

The caulked portions 34 are formed at two positions in each of the teeth 13a and 13b illustrated in FIG. 22. However, the number of the caulked portions 34 is not limited to two, and the caulked portions 34 may be formed at three or more positions in order to increase the gripping force.

Further, in FIG. 23, the magnet is inserted from the core back side. However, the present invention is not limited thereto, and the magnet may be inserted from the inner side.

As described above, according to the eleventh embodiment, the teeth sandwiching the permanent magnet and the teeth provided on the end portions of the split core block in the axial direction are manufactured through use of the same die, thereby being capable of shortening manufacture time. Further, retained portions of the teeth in the axial direction can be connected through the caulked portions.

Twelfth Embodiment

Figure 24:
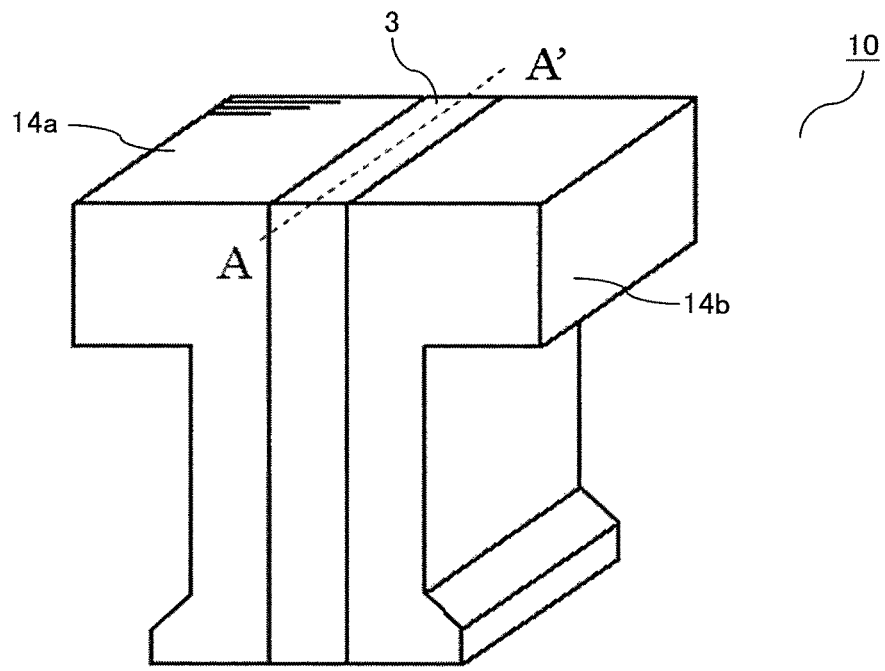
FIG. 24 is an explanatory view for illustrating teeth and the magnet forming the split core block in a permanent magnet synchronous machine of a rotary type according to a twelfth embodiment of the present invention.
Figure 25:
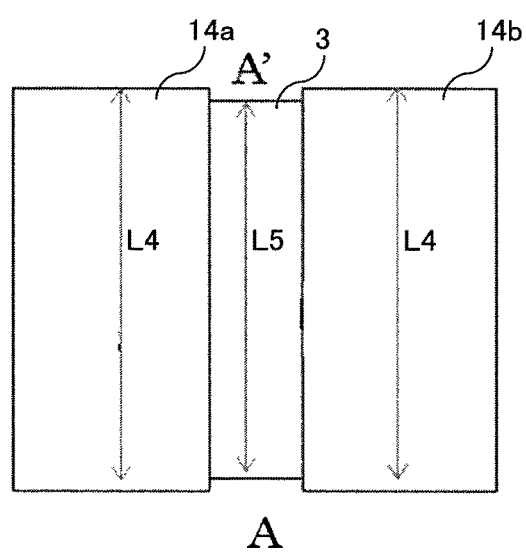
FIG. 25 is a view of an axial line A-A' in FIG. 24 in the twelfth embodiment of the present invention as viewed from an upper side.

FIG. 24 is an explanatory view for illustrating teeth and the magnet forming the split core block 10 in a permanent magnet synchronous machine of a rotary type in a twelfth embodiment of the present invention. Further, FIG. 25 is a view of an axial line A-A' in FIG. 24 in the twelfth embodiment of the present invention as viewed from an upper side.

Assuming that a length of each of teeth 14a and 14b in the axial direction is defined as L4, and a length of the permanent magnet 3 in the axial direction is defined as L5, the lengths have a relationship of L4>L5. With such relationship, a force from the winding 2 generated due to tight winding in the axial direction can be protected without being transmitted to the permanent magnet 3.

As described above, according to the twelfth embodiment, the teeth that satisfy the relationship of L4>L5 are used on both the sides of the magnet. Thus, the force from the winding generated due to tight winding can be prevented from being applied to the permanent magnet. As a result, cracking and chipping of the magnet can be prevented.

Thirteenth Embodiment

Figure 26:
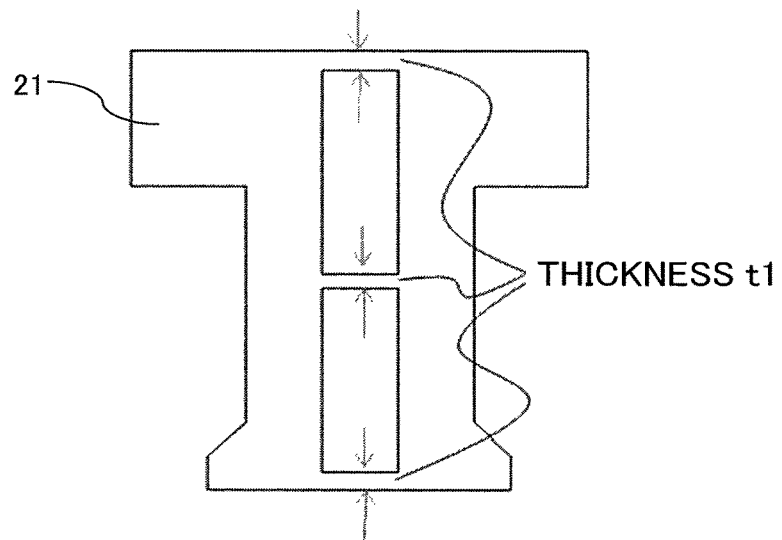
FIG. 26 is an explanatory view for illustrating a tooth structure arranged on each of end portions of a split core block in the axial direction according to a thirteenth embodiment of the present invention.

FIG. 26 is an explanatory view for illustrating a tooth structure arranged on each of end portions of the split core block 10 in the axial direction according to a thirteenth embodiment of the present invention. When the tooth 12a having the shape in FIG. 19 described in the tenth embodiment is manufactured using magnetic steel plates, assuming that a thickness of the magnetic steel plates is defined as "t", a thickness t1 of each of portions corresponding to the bridges 31 being the thin connecting portions of the tooth 21 is set so as to satisfy a relationship of t1>t due to a restriction of the die for punching.

As the thickness t1 is smaller, the leakage magnetic flux can be reduced. However, when the thickness t1 is excessively small, at the time of punching through use of the die, distortion or bending occurs at a portion corresponding to the thickness t1, which results in reduction in strength. As a result, when the teeth 11a and 11b and the permanent magnet 3 in the above-mentioned first embodiment are combined with each other to form one tooth portion, and the winding 2 is wound therearound, there is a risk in that tight winding occurs due to insufficient strength of the thin portions, with the result that the permanent magnet 3 is cracked and chipped. As a countermeasure therefor, the thicknesses are set so as to satisfy the relationship of t1>t, thereby being capable of solving the insufficiency of the strength of the thin portions.

As described above, according to the thirteenth embodiment, the thickness of each of the portions corresponding to the bridges is suitably set. Thus, when the winding is wound, the force applied to the magnet between the split teeth is suppressed, thereby being capable of preventing cracking and chipping of the magnet.

Fourteenth Embodiment

Figure 27:
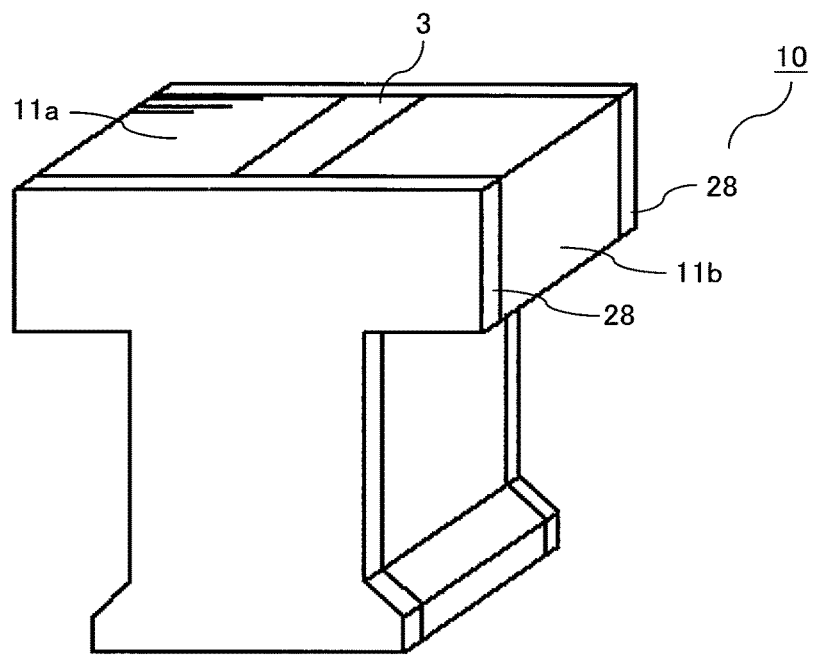
FIG. 27 is a view for illustrating a configuration of the split core block in a permanent magnet synchronous machine of a rotary type according to a fourteenth embodiment of the present invention.
Figure 28:
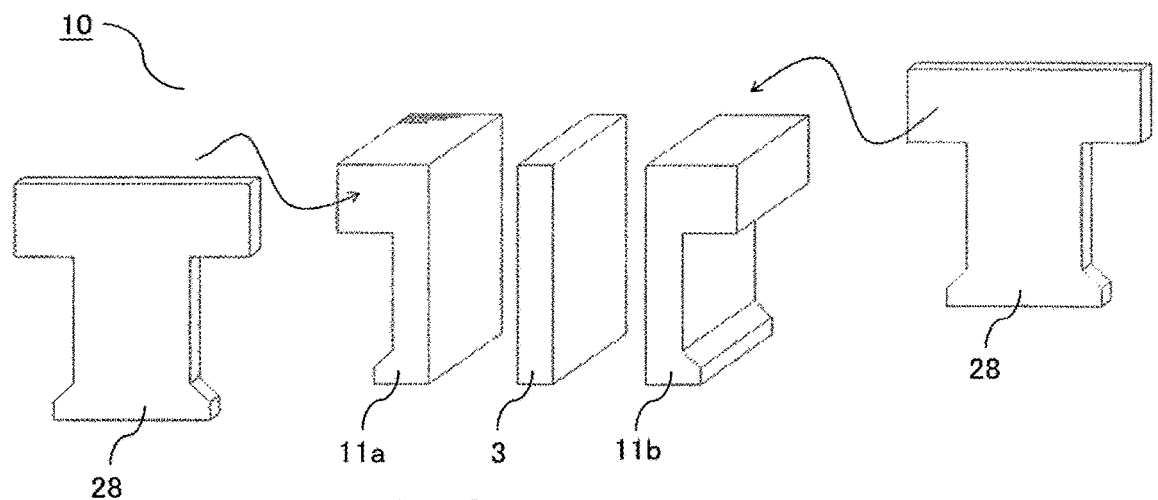
FIG. 28 is an explanatory view for illustrating assembly of teeth included in the split core block in the fourteenth embodiment of the present invention.

FIG. 27 is a view for illustrating a configuration of the split core block 10 in a permanent magnet synchronous machine of a rotary type according to a fourteenth embodiment of the present invention. Further, FIG. 28 is an explanatory view for illustrating assembly of teeth included in the split core block 10 in the fourteenth embodiment of the present invention.

Teeth 28 on end portions of the split core block in the axial direction in the fourteenth embodiment are not connected by the bridges 31, and each have no portion corresponding the air gap. With this structure, the strength can further be increased.

Further, it is more desired that the teeth on the end portions of the split core block in the axial direction each be formed of a non-magnetic material. In this case, the leakage magnetic flux at the end portions can be prevented.

As described above, according to the fourteenth embodiment, the teeth each having no portion corresponding to the air gap are used on the end portions of the split core block in the axial direction. Thus, the tooth strength can further be increased as compared to that of the structure including the portions corresponding to the bridges.

Fifteenth Embodiment

Figure 29:
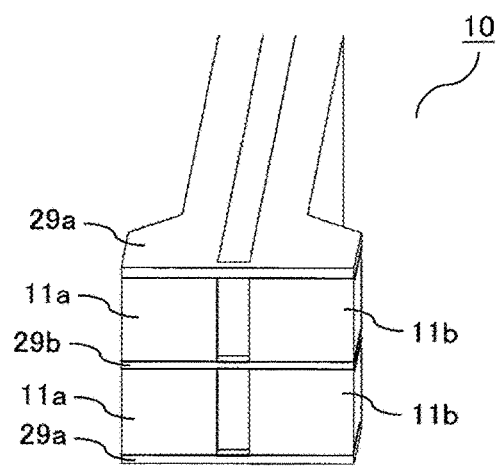
FIG. 29 is a perspective view of the split core block in a permanent magnet synchronous machine of a rotary type according to a fifteenth embodiment of the present invention as viewed from a gap surface side.

FIG. 29 is a perspective view of the split core block 10 in a permanent magnet synchronous machine of a rotary type according to a fifteenth embodiment of the present invention as viewed from a gap surface side. Further, FIG. 30 is an explanatory view for illustrating assembly of teeth included in the split core block 10 in the fifteenth embodiment of the present invention.

Figure 30:
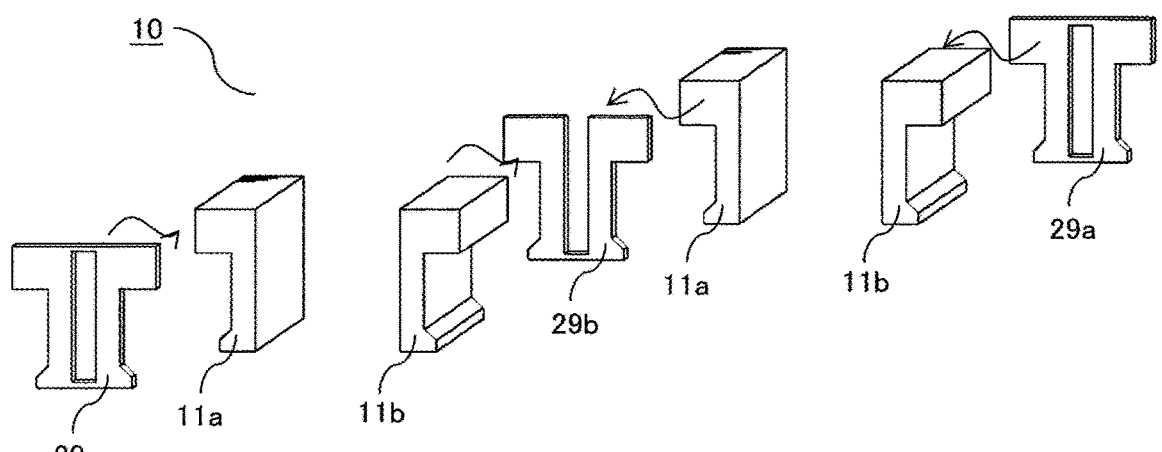
FIG. 30 is an explanatory configuration view of assembly of teeth included in the split core block in the fifteenth embodiment of the present invention.

As illustrated in FIG. 30, a tooth 29b in the fifteenth embodiment has the bridge 31 being a thin portion at a part of the gap surface in the axial direction. Meanwhile, teeth 29a each have bridges 31 on the gap surface side of the stator and the outer peripheral surface side of the core back.

Through employment of the tooth 29b having the bridge 31 being a thin portion at a part of the gap surface in the axial direction as described above, protrusion of the magnet toward the gap side can be prevented. Further, the teeth are assembled in the manner as illustrated in FIG. 30 so that a core portion corresponding to one tooth portion is first completed. After that, as described in FIG. 23 referred to above, the permanent magnet 3 is inserted from the core back side. In this manner, the assembly is facilitated.

Further, the bridge being the thin portion is formed at a part of the gap surface. Therefore, a length relationship between the magnet and the core from the gap surface to the core back portion in FIG. 3 referred to above is L1>L2.

In FIG. 30, the caulked portions are not illustrated. However, as in FIG. 23 referred to above, the assembly can be facilitated by forming the caulked portions 34. All of the members in FIG. 30 can be manufactured by switching a part of the die. The assembly is performed while sequentially performing pressing through use of the same die, thereby being capable of shortening time for manufacture.

Further, manufacture can be performed through use of the same die, thereby also being capable of reducing the die cost. In FIG. 30, the bridge being the thin portion is formed at a part of the gap surface in the axial direction. However, the number of the bridge is not particularly limited thereto.

As described above, according to the fifteenth embodiment, the tooth provided on the portion other than the end portions of the split core block in the axial direction has the shape in which the bridge is formed only on the gap surface side. As a result, the assembly can be facilitated.

REFERENCE SIGNS LIST 1 stator core, 2 winding, 3 permanent magnet, 4 rotor core, 5 movable element, 6 stator, 10 split core block, 11a, 11b, 12a, 12b, 13a, 13b, 14a, 14b tooth (pair of teeth), 21, 22, 23, 24, 24a, 24b, 25, 26, 27, 28, 29a, 29b tooth (connection tooth), 31 bridge, 32 air gap, 33 protrusion preventing portion, 34 caulked portion

The invention claimed is:

1. A permanent magnet synchronous machine, comprising a stator including a plurality of split core blocks that are continuously arranged in a rotation direction of a rotor,
the plurality of split core blocks each including:
a permanent magnet;
a pair of teeth arranged on both ends of the permanent magnet so as to sandwich the permanent magnet in the rotation direction; and
connection teeth, which are provided on axial end portions of the pair of teeth sandwiching the permanent magnet, and are configured to connect the pair of teeth,
wherein the connection teeth each have an air gap in a center portion in the rotation direction so that a plurality of bridge portions configured to connect both right and left sides of each of the connection teeth in the rotation direction is formed, and
wherein a width of each of the plurality of bridge portions in the rotation direction is larger than a width of the permanent magnet in an orientation direction.

2. A permanent magnet synchronous machine according to claim 1, wherein the connection teeth are provided on both axial end portions of each of the plurality of split core blocks.

3. A permanent magnet synchronous machine according to claim 1, wherein an axial length of each of the pair of teeth is set to be larger than an axial length of the permanent magnet.

4. A permanent magnet synchronous machine according to claim 1, further comprising a second connection tooth provided in the stator at a portion other than the axial end portions of each of the plurality of split core blocks in a direction perpendicular to a gap surface with respect to the rotor.

5. A permanent magnet synchronous machine according to claim 1, wherein the connection teeth each include a protrusion preventing portion, which is formed on at least any one of the gap surface of the stator with respect to the rotor and an outer peripheral surface of the stator on a core back side, and is configured to prevent shifting of the permanent magnet in a radial direction from a state of being sandwiched by the pair of teeth.

6. A permanent magnet synchronous machine according to claim 1, wherein in each of the connection teeth, a portion in which a winding is wound around the stator has a larger width in the rotation direction than a width of each of the pair of teeth in the rotation direction in a state of sandwiching the permanent magnet.

7. A permanent magnet synchronous machine according to claim 1, wherein the plurality of bridge portions are each formed at the portion at which the winding is wound around the stator.

8. A permanent magnet synchronous machine according to claim 1, wherein the plurality of bridge portions are each formed at a portion other than the gap surface of the stator with respect to the rotor.

9. A permanent magnet synchronous machine according to claim 1, wherein, when the pair of teeth are each formed by stacking magnetic steel plates, a thickness of each of the plurality of bridge portions in the radial direction is set to be equal to or larger than a thickness of the magnetic steel plates.

10. A permanent magnet synchronous machine according to claim 1, wherein the connection teeth are each formed of the same material as that for the pair of teeth.

11. A permanent magnet synchronous machine according to claim 1, wherein the connection teeth are each formed of a non-magnetic material.

12. A permanent magnet synchronous machine according to claim 1, wherein a configuration of the plurality of split core blocks is applied to a structure of a movable element of a linear motor.

13. A method of manufacturing the stator of the permanent magnet synchronous machine of claim 1, comprising a step of connecting magnetic steel plates of the each of the pair of teeth to each other through an operation of stacking the magnetic steel plates for the each of the pair of teeth and thereafter forming the each of the pair of teeth to have caulked portions through use of a die when the pair of teeth are to be formed by stacking the magnetic steel plates.

14. A method of manufacturing the stator of the permanent magnet synchronous machine of claim 13, further comprising a step of manufacturing the connection teeth and the pair of teeth through use of the same die, and connecting the connection teeth and the pair of teeth through the caulked portions.

15. A permanent magnet synchronous machine, comprising a stator including a plurality of split core blocks that are continuously arranged in a rotation direction of a rotor,
the plurality of split core blocks each including:
a permanent magnet;
a pair of teeth arranged on both ends of the permanent magnet so as to sandwich the permanent magnet in the rotation direction; and
connection teeth, which are provided on axial end portions of the pair of teeth sandwiching the permanent magnet, and are configured to connect the pair of teeth,
wherein the connection teeth are each prevented from having an air gap anywhere along a length of the connection teeth in the radial direction.

16. A permanent magnet synchronous machine according to claim 15, wherein the connection teeth are each formed of the same material as that for the pair of teeth.

17. A permanent magnet synchronous machine according to claim 15, wherein the connection teeth are each formed of a non-magnetic material.

18. A permanent magnet synchronous machine according to claim 15, wherein a configuration of the plurality of split core blocks is applied to a structure of a movable element of a linear motor.

* * * * *